United States Patent
Ben-Haim (10) Patent No.: US 12,332,505 B1
(45) Date of Patent: *Jun. 17, 2025

(54) EYEWEAR TETHER WITH BATTERY

(71) Applicant: Snap Inc., Santa Monica, CA (US)

(72) Inventor: Yoav Ben-Haim, Culver City, CA (US)

(73) Assignee: Snap Inc., Santa Monica, CA (US)

( * ) Notice: Subject to any disclaimer, the term of this patent is extended or adjusted under 35 U.S.C. 154(b) by 383 days.

This patent is subject to a terminal disclaimer.

(21) Appl. No.: 17/002,055

(22) Filed: Aug. 25, 2020

Related U.S. Application Data (60) Provisional application No. 62/906,321, filed on Sep. 26, 2019.

(51) Int. Cl.
*G02C 11/00* (2006.01)
*G02C 3/00* (2006.01)
*G02C 11/04* (2006.01)

(52) U.S. Cl.
CPC ............. *G02C 11/10* (2013.01); *G02C 3/006* (2013.01); *G02C 11/04* (2013.01)

(58) Field of Classification Search
CPC ........ G02C 11/10; G02C 3/006; G02C 11/04; A42B 1/247
See application file for complete search history.

(56) References Cited

U.S. PATENT DOCUMENTS

| | | | | |
|---|---|---|---|---|
| 4,254,451 A * | 3/1981 | Cochran, Jr. | ...... | A44C 15/0015 345/82 |
| 4,953,695 A * | 9/1990 | Tallman | ................. | G02C 3/003 206/5 |
| 5,835,185 A * | 11/1998 | Kallman | ............... | G02C 5/2254 351/158 |
| 6,091,546 A * | 7/2000 | Spitzer | ............... | G02B 27/0172 351/158 |
| 7,248,635 B1 * | 7/2007 | Arneson | ............. | H04L 25/0278 333/155 |

(Continued)

FOREIGN PATENT DOCUMENTS

JP  2016125932 A  *  7/2016

OTHER PUBLICATIONS

Daniel Porter, Learn the Nine Essential Parts of Eyeglasses, (2017), pp. 1-4 [online], [retrieved Aug. 8, 2022], retrieved from the Internet <URL: https://www.aao.org/eye-health/glasses-contacts/learn-nine-essential-parts-of-eyeglasses>. (Year: 2017).*

(Continued)

*Primary Examiner* — Cara E Rakowski
*Assistant Examiner* — Wesley Scott Ashton
(74) *Attorney, Agent, or Firm* — CM Law; Stephen J. Weed (57) ABSTRACT

Eyewear devices including a tether with a battery and methods for identifying characteristics of the battery and proper installation of the tether. An eyewear device includes transmission lines extending through the temples to electrical and electronic components positioned adjacent to edges of a frame. A tether including a battery is attached to the temples to provide power and enable communication flow between the electrical and electronic components rather than through the frame. Proper installation is identified based on communications passing between the eyewear device and the tether.

10 Claims, 8 Drawing Sheets

(56) References Cited

U.S. PATENT DOCUMENTS

| | | | | |
|---|---|---|---|---|
| 7,340,630 | B2* | 3/2008 | Morris | G06F 1/14 |
| | | | | 713/400 |
| 7,648,236 | B1* | 1/2010 | Dobson | G02C 11/06 |
| | | | | 351/158 |
| 7,677,723 | B2* | 3/2010 | Howell | G02C 11/10 |
| | | | | 351/158 |
| 7,798,638 | B2* | 9/2010 | Fuziak, Jr. | G02B 27/0172 |
| | | | | 351/158 |
| 8,434,863 | B2* | 5/2013 | Howell | G02C 5/14 |
| | | | | 351/158 |
| 8,915,588 | B2* | 12/2014 | Blum | G02C 11/04 |
| | | | | 351/158 |
| 9,668,217 | B1* | 5/2017 | Bamberger | H04W 52/383 |
| 9,742,997 | B1* | 8/2017 | Bamberger | H04N 1/00095 |
| 10,938,075 | B2* | 3/2021 | Fujita | H01M 10/482 |
| 10,962,809 | B1* | 3/2021 | Castañeda | G02B 27/017 |
| 11,650,435 | B2* | 5/2023 | Ben-Haim | H01B 7/04 |
| | | | | 351/158 |
| 11,934,038 | B1* | 3/2024 | Ben-Haim | G02B 27/0176 |
| 2002/0159023 | A1* | 10/2002 | Swab | H04W 4/80 |
| | | | | 351/158 |
| 2005/0078274 | A1* | 4/2005 | Howell | G02C 11/10 |
| | | | | 351/158 |
| 2006/0146281 | A1* | 7/2006 | Goodall | G02C 7/083 |
| | | | | 351/159.02 |
| 2007/0252945 | A1* | 11/2007 | Welchel | G02C 11/08 |
| | | | | 351/62 |
| 2008/0100792 | A1* | 5/2008 | Blum | G02C 11/10 |
| | | | | 351/44 |
| 2013/0207618 | A1* | 8/2013 | Renken | H02J 7/007182 |
| | | | | 320/155 |
| 2013/0235332 | A1* | 9/2013 | Blum | G02C 11/04 |
| | | | | 351/158 |
| 2013/0329183 | A1* | 12/2013 | Blum | G06F 3/013 |
| | | | | 351/158 |
| 2015/0000016 | A1* | 1/2015 | Crawford | A61F 11/06 |
| | | | | 2/423 |
| 2015/0277123 | A1* | 10/2015 | Chaum | G02B 27/017 |
| | | | | 348/62 |
| 2016/0003911 | A1* | 1/2016 | Lim | G01R 31/392 |
| | | | | 324/427 |
| 2016/0023588 | A1* | 1/2016 | Peterson | B60Q 1/441 |
| | | | | 315/77 |
| 2016/0049108 | A1* | 2/2016 | Yajima | A63F 13/212 |
| | | | | 345/212 |
| 2018/0260019 | A1* | 9/2018 | Kim | G06F 1/3287 |
| 2019/0229395 | A1* | 7/2019 | Hintermann | H01Q 9/28 |
| 2019/0250412 | A1* | 8/2019 | Jiang | G02B 27/0176 |
| 2019/0322189 | A1* | 10/2019 | Allison | B60L 55/00 |
| 2021/0048691 | A1* | 2/2021 | Ben-Haim | G02B 27/0176 |
| 2021/0062776 | A1* | 3/2021 | Kurtz | F02D 41/064 |
| 2021/0083486 | A1* | 3/2021 | Klicpera | H01M 10/443 |
| 2021/0391622 | A1* | 12/2021 | Froelich | H02P 5/695 |

OTHER PUBLICATIONS

80s Vintage Croakies, (2022), pp. 1-4 [online], [retrieved Nov. 10, 2022], retrieved from the Internet <URL: https://www.depop.com/products/abraxasaxarba-80s-vintage-croakies-the-original/>. (Year: 2022).*

Understanding Networking Components and Devices for the Network+ Exam, 2005, pp. 1-2 [online], [retrieved Apr. 14, 2023], retrieved from the Internet <URL: https://www.pearsonitcertification.com/articles/article.aspx?p=398091&seqNum=13>. (Year: 2005).*

Eyewear Retainer with Integrated Speakers and MP3 Player, 2001, pp. 1-4 [online], [retrieved Feb. 8, 2024], retrieved from the Internet <URL: https:/priorart.ip.com/IPCOM/000015114>. (Year: 2001).*

Understanding Networking Components and Devices for the Network+ Exam, 2005, pp. 1-2 [online], [retrieved Apr. 14, 2023], retrieved from the Internet <URL: https://www.personitcertification.com/articles/article.aspx?p=398091&seqNum=13>. (Year: 2005).*

Zoll Smart Battery Operator's Guide, 2005, pp. 1-2 [online], [retrieved Sep. 10, 2024], retrieved from the Internet <URL: https://device.report/m/4f78f75e1d44f96ba9de29d88deca59f188c3f8dbd616b716e92de1d6207c0e0.pdf>. (Year: 2005).*

H. Wenzl, Capacity, 2009, pp. 395-400 [online], [retrieved Sep. 9, 2024], retrieved from the Internet <URL: https://pdf.sciencedirectassets.com/279452/3-s2.0-C20091283584/3-s2.0-0f165f0152595557560605&rr=8c06160cdcf50f7c&cc=us>. (Year: 2009).*

Jelena Cvetkovic et al., Universal Battery Management System in a Handheld Device, 2012, pp. 1-4 [online], [retrieved Sep. 10, 2024] , retrieved from the Internet <URL: https://ieeexplore.ieee.org/stamp/stamp.jsp?tp=&arnumber=6196590>. (Year: 2012).*

Recognizing Battery Capacity as the Missing Link, 2015, pp. 1-5 [online], [retrieved Sep. 9, 2024], retrieved from the Internet <URL: https://batteryuniversity.com/article/recognizing-battery-capacity-as-the-missing-link>. (Year: 2015).*

Antonio Villas-Boas, You've Been Charging Your Smartphone Wrong, 2018, pp. 1-10 [online], [retrieved Sep. 9, 2024], retrieved from the Internet <URL: https://www.businessinsider.com/the-best-way-to-charge-your-smartphone-2018-1>. (Year: 2018).*

Akshat Rathi, China has Nearly Doubled its Battery-storage Capacity in Just Nine Months, 2018, pp. 1-4 [online], [retrieved Sep. 9, 2024], retrieved from the Internet <URL: https://www.weforum.org/agenda/2018/08/china-added-as-much-battery-storage-capacity-in-2018-as-all-previous-years-combined/>. (Year: 2018).*

Ananya Pritam Gogoi, Spare Parts Standardization and Its Impact on Purchasing Leverage, 2018, pp. 1-15 [online], [retrieved Oct. 17, 2023], retrieved from the Internet <URL: https://www.beroeinc.com/whitepaper/standardization-impact-on-purchasing/#:~: text= Parts . . . %20adjustment>. (Year: 2018).*

Understanding Battery Amp Hours (Ah), 2024, pp. 1-8 [online], [retrieved Sep. 9, 2024], retrieved from the Internet <URL: https://blog.ecoflow.com/au/understanding-battery-amp-hours/>. (Year: 2024).*

V. Pop et al., State-of-the-art Battery State-of-charge Determination, 16 Measurement Science and Technology R93-R110 (2005). (Year: 2005).*

Derek Heeger et al., Lithium Battery Health and Capacity Estimation Techniques Using Embedded Electronics, 2017, pp. 1-39 [ online], [retrieved Feb. 10, 2025], retrieved from the Internet <URL: https://www.osti.gov/servlets/purl/1596204>. (Year: 2017).*

Zengkai Wang et al., Remaining Capacity Estimation of Lithium-ion Batteries Based on the Constant Voltage Charging Profile, 2018 , pp. 1-22 [online], [retrieved Feb. 11, 2025], retrieved from the Internet <URL: https://pmc.ncbi.nlm.nih.gov/articles/PMC6034863/pdf/pone.0200169.pdf>. (Year: 2018).*

Jeff Shepard, How to Read Battery Discharge Curves, 2021, pp. 1-12 [online], [retrieved Feb. 10, 2025], retrieved from the Internet <URL: https://www.batterypowertips.com/how-to-read-battery-discharge-curves-faq/>. (Year: 2021).*

* cited by examiner

EYEWEAR TETHER WITH BATTERY

CROSS-REFERENCE TO RELATED APPLICATIONS

This application claims priority to U.S. Provisional Application Ser. No. 62/906,321 entitled EYEWEAR TETHER WITH BATTERY, filed on Sep. 26, 2019, the contents of which are incorporated fully herein by reference.

BACKGROUND

Conventional eyewear includes a frame that supports lenses. The frame has a bridge that is configured to receive the nose of the wearer in order to position the frame on the wearer's face such that the lenses are adjacent the eyes of the wearer. The eyewear additionally includes temples extending from the edges of the frame. The temples are configured to engage the ears of the wearer to further support the frame in the proper position on the wearer's face. Eyewear is evolving to include electronics.

DRAWINGS

The drawing figures depict one or more implementations, by way of example only, not by way of limitations. In the figures, like reference numerals refer to the same or similar elements.

DETAILED DESCRIPTION

In accordance with some examples, an eyewear device is described that includes a tether having a battery and that is capable of power transmission, data transmission, or both. The tether attaches to the temples of the eyewear device and passes behind the head of the user when worn to supply power to the eyewear device and create power and data connections between the left and right sides of the eyewear device to supplement or replace power and data transmission between the left and right sides of the eyewear through the frame. Electronics positioned in the left/right sides of the eyewear include, by way of non-limiting examples, batteries, light emitting diodes (LEDs), cameras, speakers, microphones, or other electro-mechanical component necessary.

The tether provides power to one or both sides of the eyewear device and enables power/data to flow between electronics positioned in a left side of the eyewear (e.g., left half of frame or respective temple) and a right side of the eyewear (e.g., right half of frame or respective temple) without having to go through the bridge area of the frame, thereby freeing designers from mechanical constraints, which expand aesthetic options. Additionally, the tether creates manufacturing options. The tether may include a flexible PCB (FPC) or ribbon cable connecting the two sides around the wearer's head from the back. The FPC or cable may additionally include a sheath, e.g., of fabric, woven fabric, flexible plastic, or rubber) to protect the battery, FPC or cable from environmental conditions, as well as prevent it from kinking and damaging the battery and the electrical traces/wires/components on the FPC. These and other examples are described below.

Numerous specific details are set forth herein by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
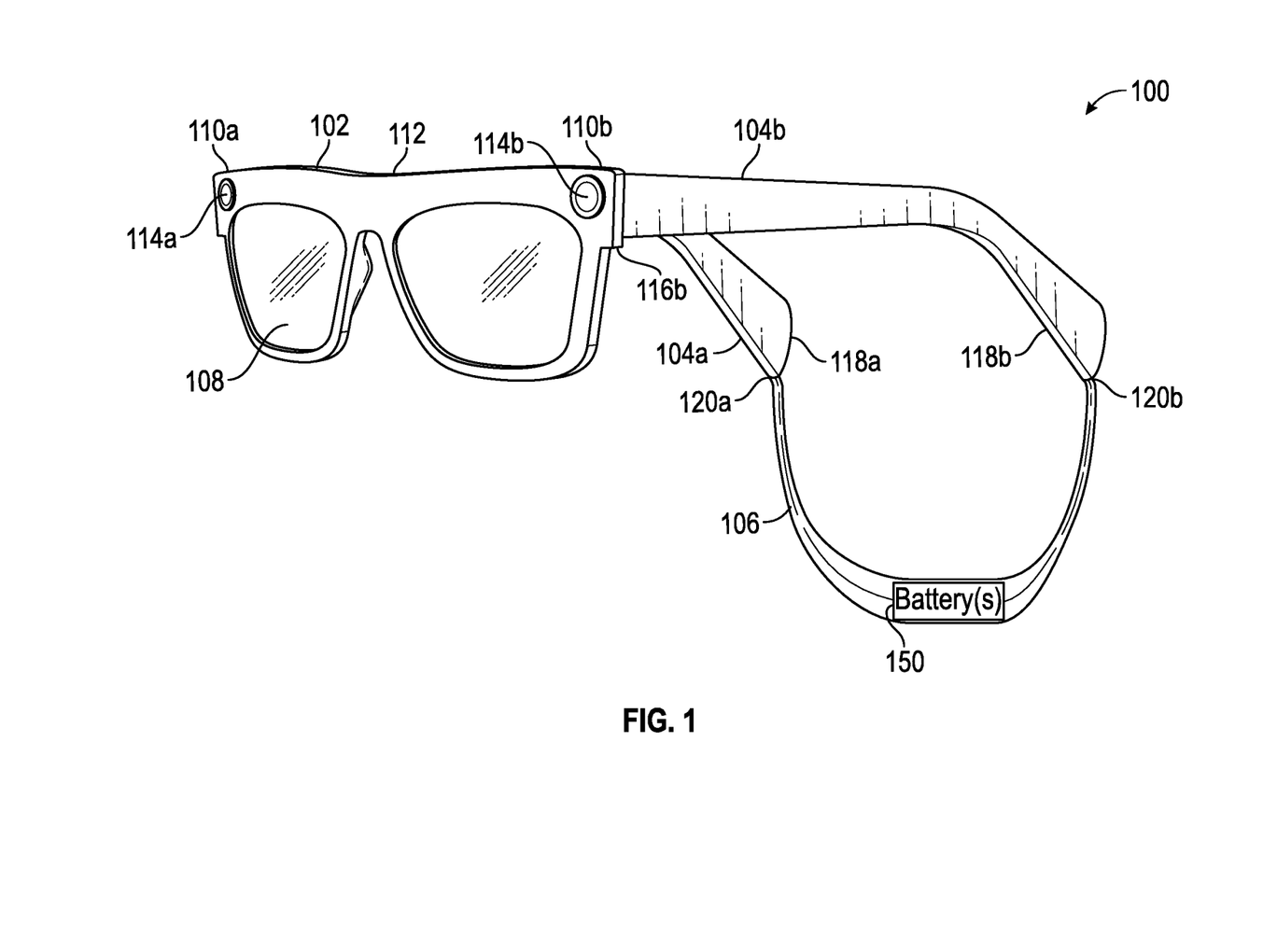
FIG. 1 is a perspective view of an example eyewear device.

FIG. 1 depicts an example eyewear device 100. The eyewear device 100 includes a frame 102, a first temple 104a extending from a first edge 110a of the frame 102, a second temple 104b extending from a second edge 110b of the frame 102, and a tether 106 coupling the first temple 104a to the second temple 104b. The tether 106 includes one or more batteries 150 and provides power, data, synchronization signal transmission, or a combination thereof to the temples, between the temples 104, or to and between the temples.

The frame 102 supports one or more optical elements 108 within a field of view of a user/wearer when worn by the user. As used herein, the term "optical elements" refers to lenses, transparent pieces of glass or plastic, projectors, screens, displays and other devices for presenting visual images or through which visual images may be perceived by a wearer. The frame 102 includes a bridge 112 for receiving a nose of the wearer. The frame 102 supports two optical elements 108, one on each side of the bridge 112. The frame 102 additionally supports a first camera 114a and a second camera 114b for capturing images/video.

The first temple 104a includes a proximate end 116a adjacent a first edge 110a of the frame 102 and a distal end 118a. Likewise, the second temple 104b includes a proximate end 116b adjacent a second edge 110b of the frame 102 and a distal end 118b. In an example, the first temple 104a is coupled to the first edge 110a of the frame 102 (e.g., by an articulated joint/hinge) and the second temple 104 is coupled to the second edge 110b of the frame 102 in the same manner. In another example, the temples 104 are integrally formed with frame 102.

In an example, the frame 102 and temples 104 are constructed of a plastics material, cellulosic plastic (e.g., cellulosic acetate), an eco-plastic material, a thermoplastic material, or the like. Core wires (not shown) may be embedded within the frame 102 or temples 104. The core wires provide structural integrity and act as a heat sink to transfer heat generated by electronic components (described below) with the frame/temples to reduce the likelihood of localized heating adjacent electronic components. The core wires may be constructed of a relatively flexible conductive metal or metal alloy material such as one or more of an aluminum, an alloy of aluminum, alloys of nickel-silver, and a stainless steel, for example. In other examples, the frame 102, temples 104, or both are formed substantially of metal or a metal alloy.

Figure 2A:
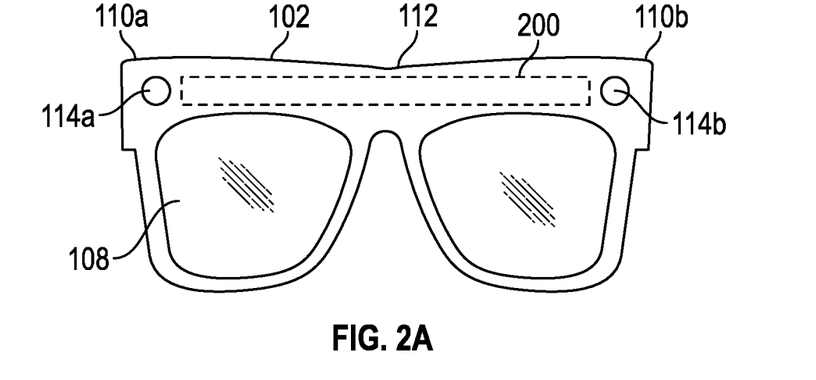
FIG. 2A is a front view of a frame of the eyewear device of FIG. 1.

FIG. 2A depicts a front view of the frame 102. The frame 102 includes a transmission line 200. The transmission line 200 includes one or more conductive lines (e.g., traces on a flexible printed circuit board) extending through the bridge 112 between electronic components (e.g., cameras 114 and associated processing circuitry) adjacent the edges 110 of the frame 102. In some examples, all power and communications between the edges 110 of the frame 102 pass through the temples 104 (FIG. 1). In these examples, the transmission line 200 may be omitted.

Figure 2B:
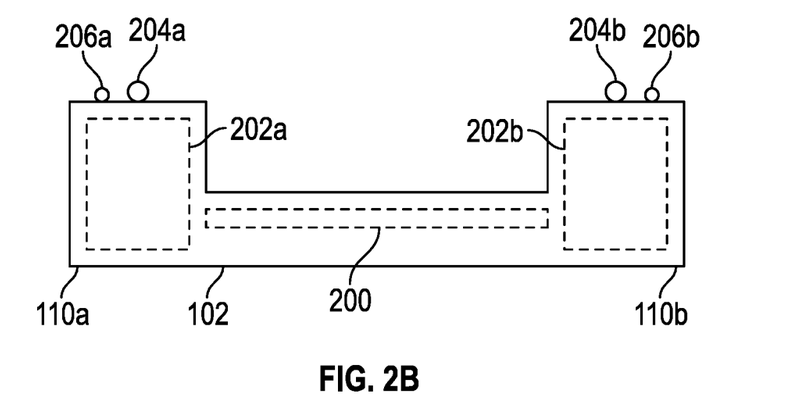
FIG. 2B is a top view of the frame of the eyewear device of FIG. 2.

FIG. 2B is a top view of the frame 102. The frame 102 supports electrical/electronic components 202a and 202b near respective edges 110a and 110b of the frame. Example components 202 includes cameras 114, projectors, indicators, processors, memory, transceivers (TX/RX, with both TX and RX combined in a single component or implemented as separate components), etc. Suitable cameras, projectors, indicators, processors, memory, and TX/RXs will be understood by one of skill in the art from the description herein. In an example, the processors are configured to communicate with one another through the transceivers via the tether.

Figure 3:
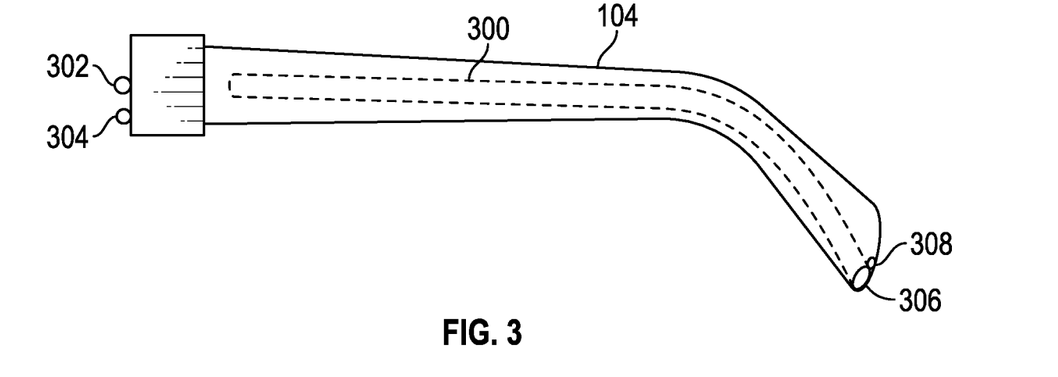
FIG. 3 is a side view of an example temple.

The frame 102 supports a first hinge component 204a and a second hinge component 204b for mating with hinge components on respective temples 104. The frame 102 additionally includes a first electrical contact 206a and a second electrical contact 206b. The first electrical contact 206a is coupled to transmission line 200 or components 202a and the second electrical contact 206b is coupled to transmission line 200 or components 202b. The electrical contacts are configured and positioned to engage mating electrical contacts (contacts 304; FIG. 3) on the respective temples 104 when the temples 104 are rotated about the hinges 204 into a wearable condition.

FIG. 3 depicts an example temple 104. The temple 104 includes a transmission line 300 including one or more conductive lines (e.g., traces on a flexible printed circuit board) extending through the temple 104. The temple 104 also includes a mating hinge component 302 configured to mate with respective hinge components 204 on the frame 102 and a fitting 306 (e.g., magnetic or friction fit component) configured and positioned to physically engage an end of the tether 106. The temple 104 additionally includes an electrical contact 304 coupled to the transmission line 300 adjacent the proximate end 116 of the temple 104 and an electrical contact 308 coupled to the transmission line 300 adjacent the distal end 118 of the temple 104 such that the electrical contacts 304/308 are interconnected via the transmission line 300.

In the illustrated example, the mating hinge component 302 and electrical contact 304 are configured and positioned such that electrical contact is established between the contact 206 of the frame and the contact 304 of the temple 104 when the temple 104 is rotated into a wearable condition about the hinge components 204/302. In alternative examples, the electrical contacts 206/304 may be interconnected by a ribbon cable or other conductor such that they are in contact in both the wearable condition and a folded condition. Additionally, although FIGS. 1, 2A, 2B, and 3 show electrical/electronic components 202 positioned in and supported by the frame 102, some or all of the electrical/electronic components 202 may be positioned in and supported by the temples 104. Furthermore, although one transmission line and contact is illustrated, additional transmission lines and contacts may be present (e.g., a power transmission line/contact, a ground transmission line/contact, a positive (+) data transmission line/contact, a negative (−) data transmission line/contact, and a clock synchronization transmission line/contact).

Figure 4A:
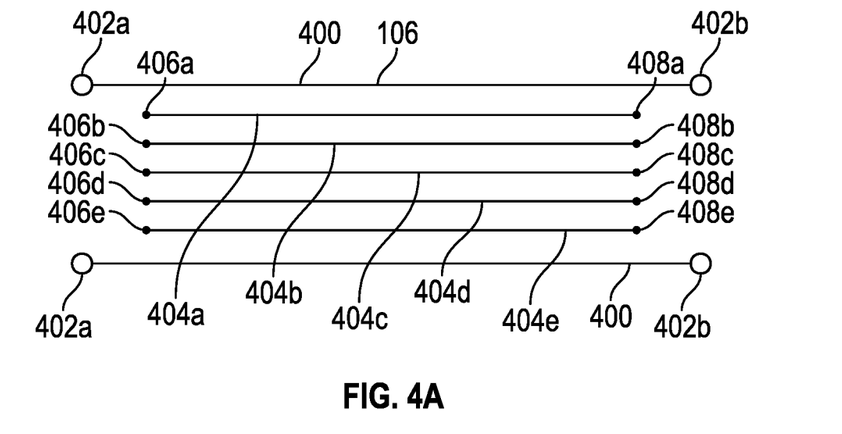
FIGS. 4A and 4B are cross-sectional views of example tethers with power and communication lines.

FIG. 4A depicts a cross-section of an example tether 106. The tether 106 includes a sheath 400. The sheath 400 may be flexible material such as fabric, woven fabric, flexible plastic, or rubber, to protect transmission lines surrounded by the sheath 400. A first connector 402a of the tether 106 is positioned on the sheath 400 adjacent a first end of the tether 106, e.g., to engage a fitting 306 of a temple 104 of an eyewear device 100. Likewise, a second connector 402b of the tether 106 is positioned adjacent on the sheath 400 adjacent a second end of the tether 106, e.g., to engage a fitting 306 of the other temple 104 of the eyewear device 100.

The tether 106 includes five transmission lines 404a-e surrounded by the sheath 400. Each transmission line 404a-e includes respective first electrical contacts 406a-e adjacent a first end of the tether 106 for engaging corresponding contacts 308 of a temple 104 and respective second electrical contacts 408a-e for engaging corresponding contacts 308 of the other temple 104. A first transmission line 404a may be a power transmission line, a second transmission line 404b may be a ground transmission line, a third transmission line 404c may be a positive (+) data transmission line, a fourth transmission line 404d may be a negative (−) data transmission line, and a fifth transmission line 404e may be a clock synchronization transmission line. More or fewer transmission lines may be included within the sheath 400.

The electrical contacts 304/306 may be grouped within a connector. The connector may be a standard connector such as a universal serial bus (USB) type B or type C connector or a proprietary connector. The corresponding connectors 308 of the temples 104 are configured to mate with the connectors of the tether 106.

In one example, the tether 106 is permanently affixed to the temples 104. In accordance with this example, the contacts may be the transmission line carrying the power/signal. In other examples, at least one of the ends of the tether 106 may be removed from a respective temple 104. In accordance with this example, the tether can be completely removed or one end of the tether 106 may be removed to expose the corresponding contacts, e.g., for providing access for charging electrical/electronic components within the eyewear temple 104 or frame 102.

Figure 4B:
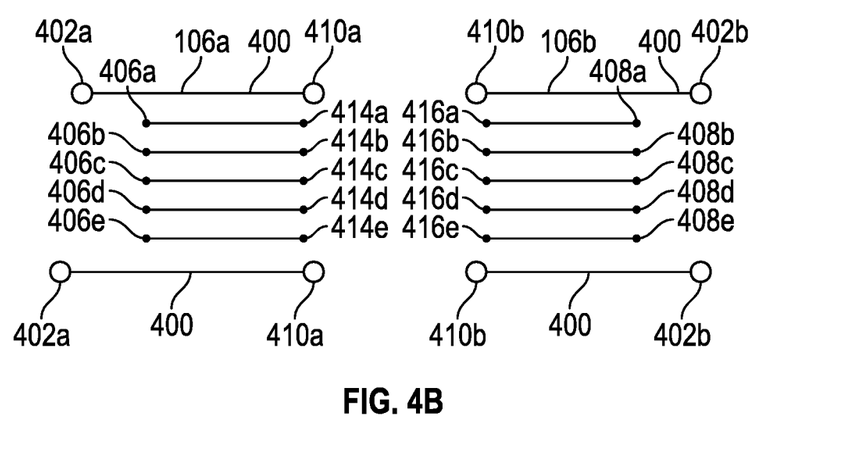

FIG. 4B illustrates another example tether 106. The illustrated tether 106 includes a first tether portion 106a and a second tether portion 106b. The two portions may include mating connectors 410a/410b (e.g., magnetic or friction fit for interconnecting the sheath 400) and respective contacts 414a-e/416a-e for interconnecting the transmission lines. The electrical contacts 414a-e/416a-e may be grouped within mating connectors, e.g., standard connector such as USB type B or type C connector or a proprietary connector. In accordance with this example, a portion of the tether 106a, b may be permanently fixed to the respective temples 104 and connected/disconnected by the wearer to facilitate putting on and removal of the eyewear device 100.

Figure 4C:
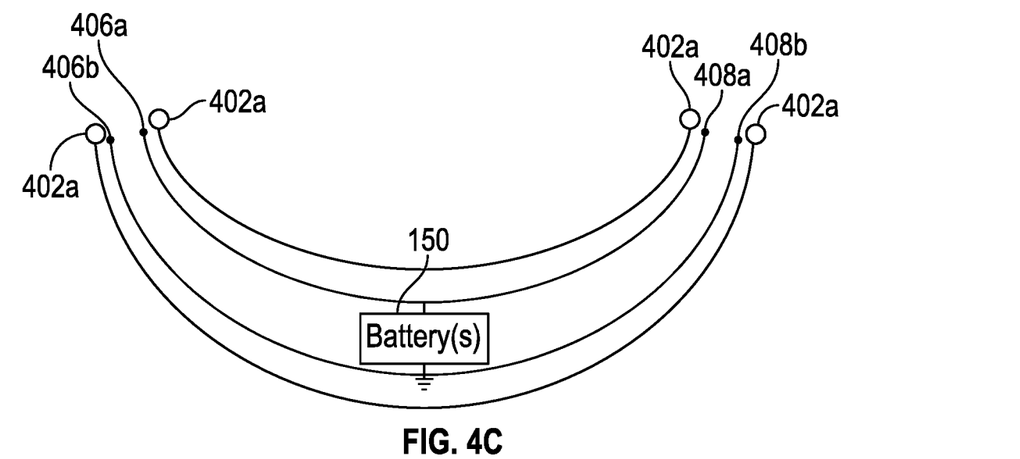
FIGS. 4C and 4D are cross-sectional views of example tethers with batteries.

FIG. 4C depicts a cross-section of another example tether 106. The tether 106 includes a battery 150 and a sheath 400 surrounding the battery 150 and associated transmission lines. The sheath 400 may be flexible material such as fabric, woven fabric, flexible plastic, or rubber, to protect the battery 150 and transmission lines surrounded by the sheath 400. A first connector 402a of the tether 106 is positioned on the sheath 400 adjacent a first end of the tether 106, e.g., to engage a fitting 306 of a temple 104 of an eyewear device 100. Likewise, a second connector 402b of the tether 106 is positioned adjacent on the sheath 400 adjacent a second end of the tether 106, e.g., to engage a fitting 306 of the other temple 104 of the eyewear device 100.

The tether 106 includes two transmission lines 404a, b surrounded by the sheath 400. Each transmission line 404a, b includes respective first electrical contacts 406a, b adjacent a first end of the tether 106 for engaging corresponding contacts 308 of a temple 104 and respective second electrical contacts 408a, b for engaging corresponding contacts 308 of the other temple 104. A first transmission line 404a may be a power transmission line and the second a second transmission line 404b may be a ground transmission line. The tether 106 may additionally include one or more other transmission lines such as a positive (+) data transmission line, a negative (−) data transmission line, and a clock synchronization transmission line. More or fewer transmission lines may be included within the sheath 400.

In one example, the tether 106 is permanently affixed to the temples 104. In accordance with this example, the contacts may be the transmission line carrying the power/signal. In other examples, at least one of the ends of the tether 106 may be removed from a respective temple 104, e.g., for charging the battery 150. In accordance with this example, the tether 106 can be completely removed or one end of the tether 106 may be removed to expose the corresponding contacts on the eyewear device, e.g., for providing access for charging electrical/electronic components within the eyewear temple 104 or frame 102.

Figure 4D:
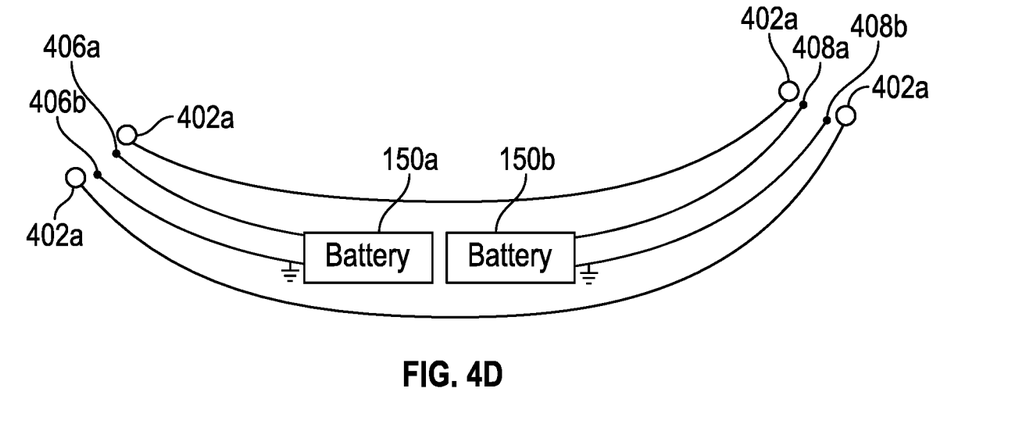

FIG. 4D illustrates another example tether 106. The illustrated tether 106 includes a first battery 150a and a second battery 150b. In the illustrated example, the first battery 150a is positioned and connected to provide power to the temple on one side of the eyewear device and the second battery 150b is positioned and connected to provide power to the temple on the other side of the eyewear device. In another example, the first and second batteries 150a, b may each be connected to deliver power to the temples on both sides of the eyewear device. The batteries may be permanently installed or removably installed within the tether 106.

Figure 4E:
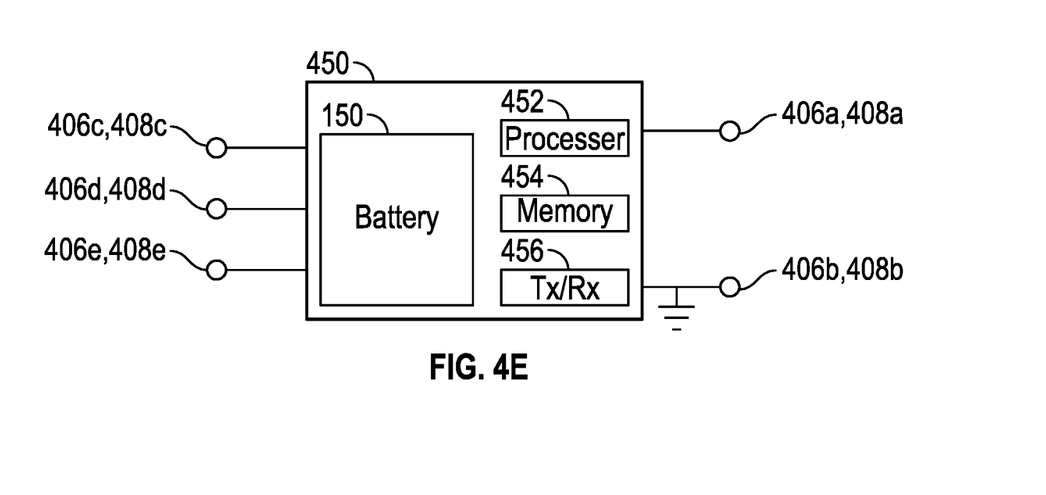
FIG. 4E is a block diagram of a battery housing.

FIG. 4E depicts a battery housing 450 for the battery 150. The housing 450 may be a rigid plastic or metal housing to protect the battery. In one example the housing includes an elastomer with a rigid interior. In addition to the battery 150, the battery housing may contain a processor 452, a memory 454, and a transceiver 456. In use, the processor 452 executes instructions stored in the memory 454, e.g., for communication with the processors in the eyewear device via transceiver 456.

In one example, tethers 106 with different battery capacities are provided. A first, relatively bulk tether is configured to deliver a relatively large amount of power and a second, relatively slim tether is configured to deliver a relatively small amount of power. This enable the user to select the appropriate eyewear device/tether combination to suit their power or fashion needs. The multiple tethers and the eyewear device may be provided to form a kit.

FIGS. 5A, 5B, 6, and 7 depict example methods 500 and 550 for identifying proper installation of a tether for the eyewear device 100 and identifying battery characteristics. Although shown as occurring serially, the blocks of FIGS. 5A, 5B, 6, and 7 may be reordered or parallelized depending on the implementation. Additionally, one or more of the blocks may be omitted. Furthermore, although the methods are described with reference to the eyewear device 100 described herein, the methods may be implemented using other eyewear devices.

Figure 5A:
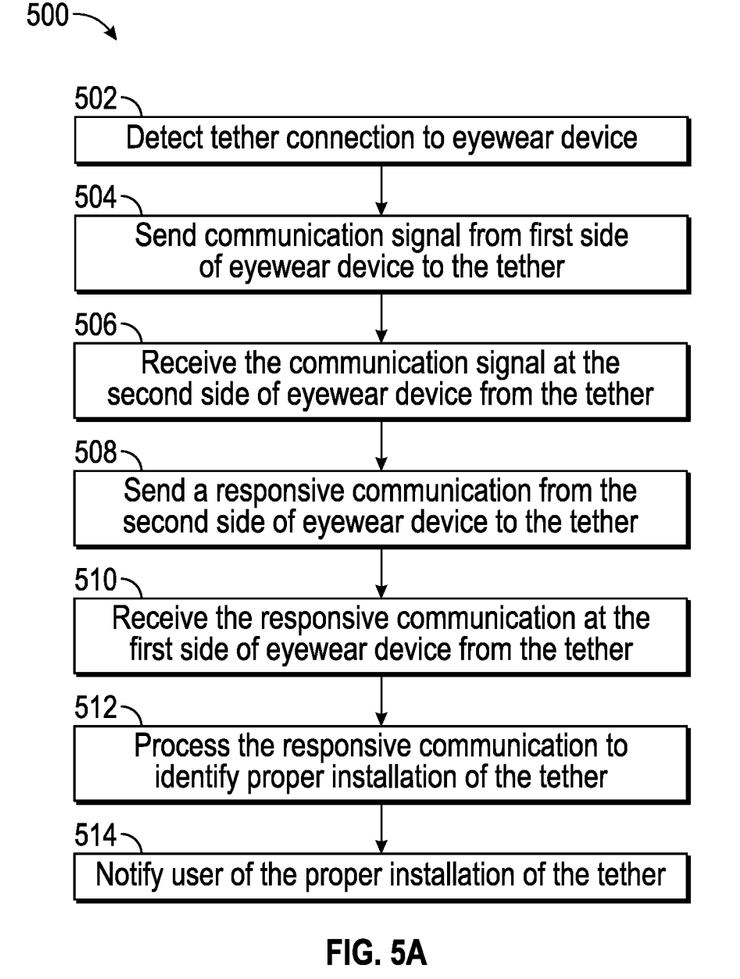
FIG. 5A is a flow chart of example steps confirming proper installation of a tether to an eyewear device.
Figure 8:
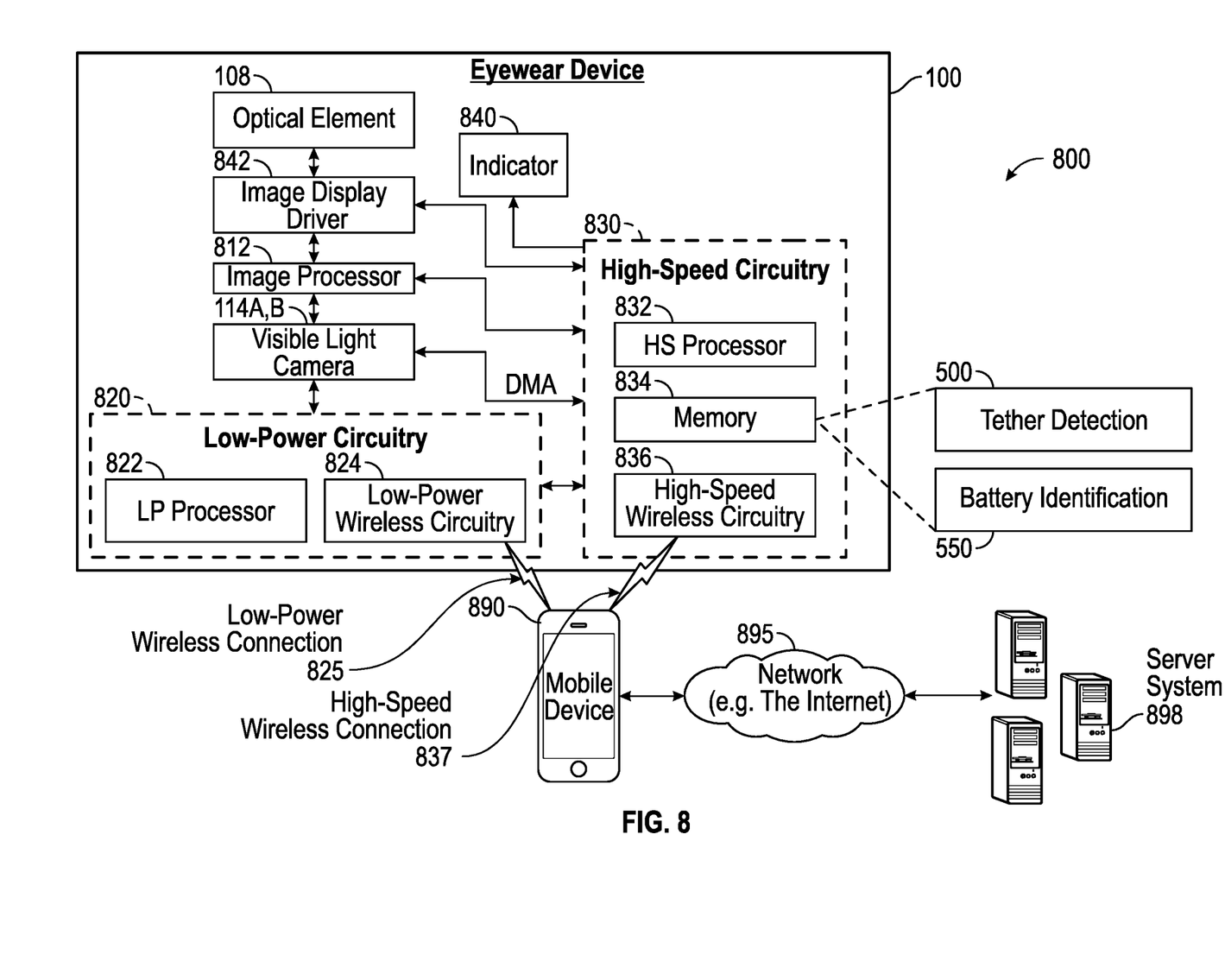
FIG. 8 is a block diagram of example electronics of an eyewear device and connections of the eyewear device with other components.

At block 502, detect tether connection to the eyewear device. In an example, a processor (e.g., processor 822 or processor 832; FIG. 8) detects connection of the tether (e.g., the first mating connector of the tether to a first connector of a temple of the eyewear). The processor detects the connection responsive to a signal from a connector in the temple adjacent the distal end of the temple. In one example, the detector may be electro-magnetic detector that detects a change in the magnetic field when the mating connector of the tether is brought into contact with the temple. In another example, the detector may be a pair of wires that are interconnected to complete a circuit when the mating connector of the tether is brought into contact with a connector in the temple. In accordance with this example, the processor may periodically measure resistance and detect connection when the measured resistance matches a known value or may periodically send a signal and detect connection when a responsive signal is received.

Figure 6:
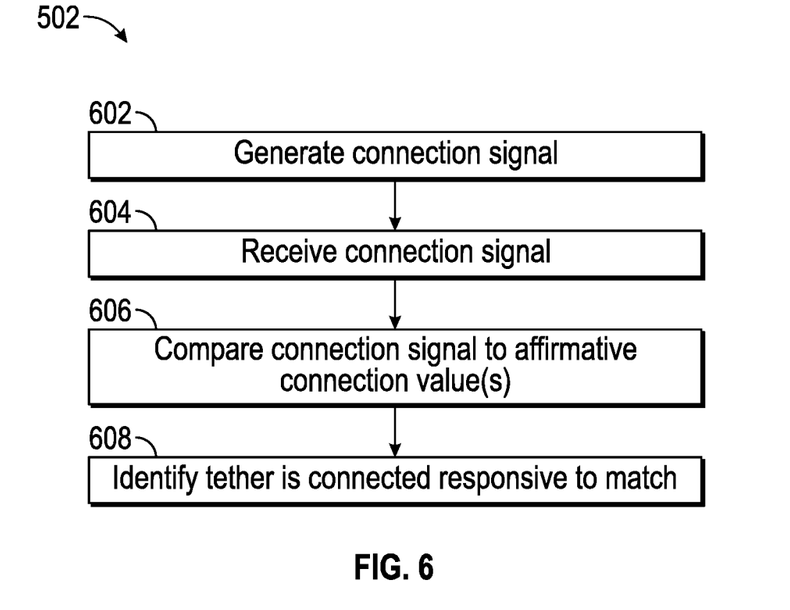
FIG. 6 is a flow chart of example steps for detecting connection of a tether in a step of FIG. 5A.

FIG. 6 depicts an example method for detecting connection of a tether in the method of FIG. 5. At block 602, a connection signal is generated. A detector (such as an electromagnetic sensor) positioned adjacent the distal end of a temple may generate a signal when the tether is brought into contact with the tether in the vicinity of the detector. At block 604, receive the connection signal. The processor of the eyewear device may receive the generated connection signal from the detector. At block 606, compare the connection signal to a known affirmative connection value or range of values. The processor may compare the connection signal to a value or range of values stored in a memory accessible to the processor. At block 608, identify the tether is connected responsive to a match with the affirmative connection value or range of values. The processor may identify the connection in response to identifying a match with the affirmative connection value or range of values.

Referring back to FIG. 5A, at block 504, send a communication signal from the first side of the eyewear device to the tether. In an example, the processor in a first side of the eyewear (e.g., the left or the right side) sends (via a corresponding transceiver) to the tether, a communication signal responsive to detection of the connection of the tether.

At block 506, receive the communication signal at the second side of eyewear device from the tether. In an example, the processor in a second side of the eyewear (e.g., the right or the left side) receives (via a corresponding transceiver) the communication signal from the tether.

At block 508, send a responsive communication from the second side of the eyewear to the tether. In an example, the processor in the second side sends (via the corresponding transceiver) a responsive communication to the tether. In accordance with this example, the processor processes and compares the received communication signal from the first side of the eyewear, generates a responsive communication, and sends the responsive communication.

At block 510, receive the responsive communication at the first side of eyewear device from the tether. In an example, the first processor in the first side receives (via the corresponding transceiver) the responsive communication from the tether.

Figure 7:
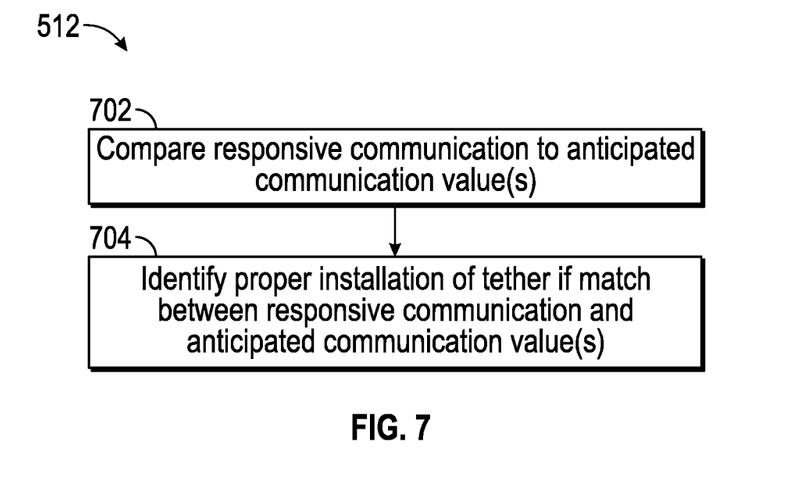
FIG. 7 is a flow chart of example steps for identifying proper installation of the tether in another step of FIG. 5A.

At block 512, process the responsive communication to identify proper installation of the tether. In an example, the first processor processes the responsive communication from the tether to identify proper installation. Identification of proper installation may include comparing the responsive communication to an anticipated communication value(s) (blocks 702; FIG. 7) and identifying proper installation of the tether if there is a match between the responsive communication and the anticipated communication values(s) (block 704). If there is not a match between the responsive communication and the anticipated communication values(s) it may be determined by the processor that the installation was unsuccessful/improper.

At block 514, notify the user of the proper installation of the tether. In an example, the processor controls the notifications to the user. Notification of proper installation may include illuminating a green LED on the eyewear or the tether, verbally presenting dialog such as "tether properly installed" via a speaker (not shown), or presenting an image or text indicating proper installation on the optical element 108. Notification of improper installation may also be presented. Notification of improper installation may include illuminating a red LED, verbally presenting dialog such as "tether not properly installed" via a speaker (not shown), or presenting an image or text indicating improper installation on the optical element 108.

Figure 5B:
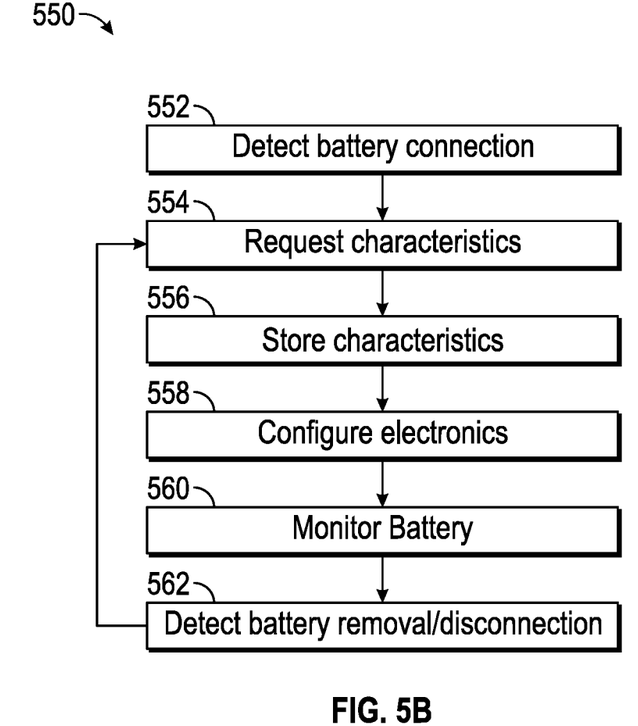
FIG. 5B is a flow chart of example steps for detecting a battery connection and determining battery characteristics.

Referring to FIG. 5B, at block 552, detect battery connection. A processor (e.g., processor 822 or processor 832; FIG. 8) detects connection of the battery 150. The processor detects the connection responsive to a signal from the battery 150. In one example, the processor sends a signal in response to detection of a tether (block 502) and detects a battery connection if a responsive communication is received from the battery 150.

At block 554, request characteristics of the battery. The processor (e.g., processor 822 or processor 832; FIG. 8) requests characteristics of the battery 150. The processor request characteristic by sending an inquiry signal to the battery 150. A processor associated with the battery 150 (e.g., processor 452) processes the inquiry signal and responds with the battery characteristics (e.g., voltage level and charge capacity). At block 556, store characteristics of the battery. The processor (e.g., processor 822 or processor 832; FIG. 8) stores the battery characteristics (e.g., in memory 834; FIG. 8).

At block 558, configured the electronics. The processor (e.g., processor 822 or processor 832; FIG. 8) configures the electronics of the eyewear device based on the battery characteristics. For example, the processor may configure the eyewear device in a low power mode if the charge characteristics indicate a low charge capacity.

At block 560, monitor the battery. The processor (e.g., processor 822 or processor 832; FIG. 8) monitors the battery 450. For example, the processor may periodically query the battery for charge characteristics. The processor may reconfigure the eyewear device into a low power mode if the charge characteristics indicate a low level of charge.

Add block 562, detect removal or disconnection of the battery. The processor (e.g., processor 822 or processor 832; FIG. 8) detects when the battery has been removed or disconnected. The processor, for example, detect a voltage drop indicative that the battery is no longer available and switch to a power source within the eyewear device.

FIG. 8 depicts a high-level functional block diagram including example electronic components disposed in the eyewear device 100. The illustrated electronic components include a processor 832 and a memory 834, which includes static and dynamic memory. Each side of the eyewear device 100 may include one or more of the electronic components. Some of the components (such as a processor) may or may not be present in both sides while other components (sch as wireless circuitry) may or may not be present only in one side.

Memory 834 includes instructions for execution by processor 832 to implement functionality of eyewear device 100 including instructions for processor 832 to detect connection of a tether, identify proper installation of the tether, and identify properties of the battery 150 (e.g., by performing the steps of flow charts 500 and 550). Processor 832 receives power from battery (not shown) and executes instructions stored in memory 834, or integrated with the processor 832 on-chip, to perform functionality of eyewear device 100 such as image processing for optical element 108, controlling operation of eyewear device 100, and communicating with external devices via wireless connections.

The eyewear device 100 may form part of a system by communicating with a mobile device 890 and a server system 898 connected via various networks. Mobile device 890 may be a smartphone, tablet, laptop computer, access point, or any other such device capable of connecting with eyewear device 100 using both a low-power wireless connection 825 and a high-speed wireless connection 837. Mobile device 890 is connected to server system 898 and network 895. The network 895 may include any combination of wired and wireless connections.

Eyewear device 100 includes at least two visible light cameras 114A, B (one associated with the left side and one associated with the right side). Eyewear device 100 further includes two optical elements 108A, B (one associated with the left side and one associated with the right side) and an indicator 840 such as one or more light emitting diodes (LED). Eyewear device 100 also includes image display driver 842, image processor 812, low-power circuitry 820, and high-speed circuitry 830. The components shown in FIG. 11 for the eyewear device 100 are located on one or more circuit boards, for example a PCB or flexible PCB, in the temples. Alternatively, or additionally, the depicted components can be located in the housings, frames, hinges, or bridge of the eyewear device 100. Left and right visible light cameras 114A, B can include digital camera elements such as a complementary metal-oxide-semiconductor (CMOS) image sensor, charge coupled device, a lens, or any other respective visible or light capturing elements that may be used to capture data, including images of scenes with unknown objects.

As shown in FIG. 8, high-speed circuitry 830 includes high-speed processor 832, memory 834, and high-speed wireless circuitry 836. In the example, the image display driver 842 is coupled to the high-speed circuitry 830 and operated by the high-speed processor 832 in order to drive the left and right optical elements 108A, B. High-speed processor 832 may be any processor capable of managing high-speed communications and operation of any general computing system needed for eyewear device 100. High-speed processor 832 includes processing resources needed for managing high-speed data transfers on high-speed wireless connection 837 to a wireless local area network (WLAN) using high-speed wireless circuitry 836. In certain examples, the high-speed processor 832 executes an operating system such as a LINUX operating system or other such operating system of the eyewear device 100 and the operating system is stored in memory 834 for execution. In addition to any other responsibilities, the high-speed processor 832 executing a software architecture for the eyewear device 100 is used to manage data transfers with high-speed wireless circuitry 836. In certain examples, high-speed wireless circuitry 836 is configured to implement Institute of Electrical and Electronic Engineers (IEEE) 802.11 communication standards, also referred to herein as Wi-Fi. In other examples, other high-speed communications standards may be implemented by high-speed wireless circuitry 836.

Low-power wireless circuitry 824 and the high-speed wireless circuitry 836 of the eyewear device 100 can include short range transceivers (Bluetooth™) and wireless wide, local, or wide area network transceivers (e.g., cellular or WiFi). Mobile device 890, including the transceivers communicating via the low-power wireless connection 825 and high-speed wireless connection 837, may be implemented using details of the architecture of the eyewear device 100, as can other elements of network 895.

Memory 834 includes any storage device capable of storing various data and applications, including, among other things, color maps, camera data generated by the left and right visible light cameras 114A, B and the image processor 812, as well as images generated for display by the image display driver 842 on the optical elements 180A, B. While memory 834 is shown as integrated with high-speed circuitry 830, in other examples, memory 834 may be an independent standalone element of the eyewear device 100. In certain such examples, electrical routing lines may provide a connection through a chip that includes the high-speed processor 832 from the image processor 812 or low-power processor 822 to the memory 834. In other examples, the high-speed processor 832 may manage addressing of memory 834 such that the low-power processor 822 will boot the high-speed processor 832 any time that a read or write operation involving memory 834 is needed.

Server system 898 may be one or more computing devices as part of a service or network computing system, for example, that include a processor, a memory, and network communication interface to communicate over the network 895 with the mobile device 890 and eyewear device 100. Eyewear device 100 may be connected with a host computer. For example, the eyewear device 100 is paired with the mobile device 890 via the high-speed wireless connection 837 or connected to the server system 898 via the network 895.

Output components of the eyewear device 100 include visual components, such as the left and right optical elements 108A, B (e.g., see-through display, a display such as a liquid crystal display (LCD), a plasma display panel (PDP), a light emitting diode (LED) display, a projector, or a waveguide). The optical elements 180A, B may be driven by the image display driver 842. The output components of the eyewear device 100 further include acoustic components (e.g., speakers), haptic components (e.g., a vibratory motor), other signal generators, and so forth. The input components of the eyewear device 100, the mobile device 890, and server system 898, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements. Such peripheral device elements may include biometric sensors, additional sensors, or display elements integrated with eyewear device 100. For example, peripheral device elements may include any I/O components including output components, motion components, position components, indicators, or any other such elements described herein.

For example, biometric components may be used to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 825 and 837 from the mobile device 890 via the low-power wireless circuitry 824 or high-speed wireless circuitry 836.

Some advantages offered by various examples described herein include reduction in the size of the temples or making room for other components in the temples by relocating the battery (or the primary battery) to the tether, ability to use a larger battery that would not fit in the eyewear device, and shifting weight off of the nose of the wearer and back onto the ears for user comfort. Additionally, in accordance with some examples, the user has the option to bring multiple batteries and replace as needed, purchase larger capacity battery pack or tethers with larger capacity battery packs, and the user may be provided with the option to customize their eyewear device with tethers have different battery capacities or different sheath styling.

According to some examples, an "application" or "applications" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third-party application can invoke API calls provided by the operating system to facilitate functionality described herein.

The terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An eyewear device comprising:
  a frame configured to support an optical element, the frame having a first edge and a second edge;
  a first temple having a first proximal end adjacent the first edge of the frame, a first distal end, and a first set of one or more transmission lines including a first conductor adjacent the first distal end;
  a first processor adjacent the first proximal end, the first processor coupled to the first set of one or more transmission lines via a first transceiver;
  a second temple having a second proximal end adjacent the second edge of the frame, a second distal end, and a second set of one or more transmission lines including a second conductor adjacent the second distal end;
  a second processor adjacent the second proximal end, the second processor coupled to the second set of one or more transmission lines via a second transceiver; and
  at least one tether including at least one battery and a third set of one or more transmission lines, the third set of one or more transmission lines including:
    at least one power transmission line configured to connect the at least one battery to the first conductor adjacent the first distal end and to connect the at least one battery to the second conductor adjacent the second distal end; and
    at least one data transmission line configured to connect the first processor coupled to the first set of one or more transmission lines via the first transceiver to the second processor coupled to the second set of one or more transmission lines via the second transceiver, wherein the first processor is configured to send a data communication via the first transceiver through the at least one tether and the second processor is configured to receive the data communication via the second transceiver from the first transceiver through the at least one tether;
  wherein:
    the first processor and the first transceiver are positioned in the first temple or in the frame adjacent the first edge;
    the second processor and the second transceiver are positioned in the second temple or the frame adjacent the second edge;
    the first and second processors are configured to receive power from the at least one battery and to communicate with one another via the first and second transceivers through the at least one tether, and
    the first processor is configured to detect connection of a first mating connector of the at least one tether to a first connector of the eyewear device, to send a communication signal to the at least one battery, to receive from the at least one battery a responsive communication including one or more battery characteristics comprising at least a battery charge capacity indicating an amount of charge that can be stored by the at least one battery, and to configure the eyewear device according to the one or more battery characteristics;
  wherein the at least one tether comprises:
    a first tether, wherein a respective at least one battery of the first tether has a first batter charge capacity; and
    a second tether, interchangeably attachable to the frame in replacement of the first tether, wherein a respective at least one battery of the second tether has a second battery charge capacity;
    wherein the first battery charge capacity is greater than the second battery charge capacity; and
  wherein the first processor is configured to configure the eyewear device in a power mode according to whether the first battery charge capacity or the second battery charge capacity is identified in the responsive communication.

2. The eyewear device of claim 1, wherein the at least one battery includes a first battery within the at least one tether and a second battery within the at least one tether and wherein the third set of one or more transmission lines is configured to connect the first battery to the first conductor and the second battery to the second conductor.

3. The eyewear device of claim 1, wherein the one or more battery characteristics further comprise a battery voltage level status, and wherein the eyewear device further comprises a notification device supported by at least one of the frame, the first temple, the second temple, or the at least one tether and wherein the first processor is configured to notify a user via the notification device regarding the battery voltage level status of the battery.

4. The eyewear device of claim 1, further comprising a battery housing within the at least one tether including a cavity for receiving the battery, wherein the battery housing is configured to enable a user to replace the battery.

5. The eyewear device of claim 1, further comprising a battery housing within the at least one tether, wherein the at least one tether includes a flexible sheath surrounding the battery housing.

6. The eyewear device of claim 5, wherein the battery housing is rigid and wherein the flexible sheath is selected from the group consisting of silicone, a thermoplastic elastomer, and a fabric.

7. The eyewear device of claim 1, wherein the first temple includes a connector selected from the group consisting of a universal serial bus (USB) connector, a friction fit connector, and a magnetic attachment connector and the at least one tether includes a mating connector selected from the group consisting of a USB connector, a friction fit connector, and a magnetic attachment connector.

8. The eyewear device of claim 1, wherein the third set of one or more transmission lines includes:
- a clock transmission line configured to connect the first processor coupled to the first set of one or more transmission lines via the first transceiver to the second processor coupled to the second set of one or more transmission lines via the second transceiver.

9. The eyewear device of claim 8, wherein the frame includes a bridge between the first edge and the second edge and wherein there are no transmission lines that pass through the bridge.

10. The eyewear device of claim 1, wherein the first processor is configured to send the data communication directly from the first transceiver to the second transceiver.

* * * * *